United States Patent
Brengartner et al.

(10) Patent No.: US 11,454,531 B2
(45) Date of Patent: Sep. 27, 2022

(54) COMPENSATION OF A PHASE SHIFT OF AT LEAST ONE COMPONENT OF AN ELECTRONIC SYSTEM OF A VIBRONIC SENSOR

(71) Applicant: Endress+Hauser SE+Co. KG, Maulburg (DE)

(72) Inventors: Tobias Brengartner, Emmendingen (DE); Manuel Sautermeister, Schopfheim (DE); Romuald Girardey, Blotzheim (FR)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 841 days.

(21) Appl. No.: 16/332,834

(22) PCT Filed: Sep. 11, 2017

(86) PCT No.: PCT/EP2017/072749
§ 371 (c)(1),
(2) Date: Mar. 13, 2019

(87) PCT Pub. No.: WO2018/050595
PCT Pub. Date: Mar. 22, 2018

(65) Prior Publication Data
US 2019/0368914 A1     Dec. 5, 2019

(30) Foreign Application Priority Data
Sep. 13, 2016  (DE) ..................... 10 2016 117 194.8

(51) Int. Cl.
*G01F 23/296*    (2022.01)
*G01N 29/02*    (2006.01)

(52) U.S. Cl.
CPC ....... *G01F 23/2961* (2013.01); *G01N 29/022* (2013.01)

(58) Field of Classification Search
CPC .. G01F 23/2961; G01F 25/24; G01F 23/2967; G01N 29/022; G01N 2009/006; G01N 2011/0006; G01N 11/16
See application file for complete search history.

(56) References Cited

U.S. PATENT DOCUMENTS 4,488,427 A   12/1984  Matusik et al.
7,436,100 B2 * 10/2008 D'Angelico ........... G01N 11/16
                                                            310/319
(Continued)

FOREIGN PATENT DOCUMENTS

CN      1602411 A     3/2005
CN      1705863 A    12/2005
(Continued)

OTHER PUBLICATIONS

International Search Report for Patent Application No. PCT/EP2017/072749, WIPO, dated Nov. 29, 2017, 14 pp.

*Primary Examiner* — Matthew G Marini
*Assistant Examiner* — Leo T Hinze
(74) *Attorney, Agent, or Firm* — Mark A. Logan; Endress+Hauser (USA) Holding Inc.

(57) ABSTRACT

The invention relates to a compensation device for the compensation of a phase shift caused a component of an electronic system unit of a vibronic sensor. The compensation device includes a bridging unit for the electrical bridging of at least the electromechanical converter; a signal generator for generating a test excitation signal; a phase detection unit for determining the phase shift between the test excitation signal and a test receive signal that passes through the bridging unit and the component of the electronic system unit; and a computer unit which determines a phase compensation instruction from the first phase shift.

15 Claims, 3 Drawing Sheets

(56) References Cited

U.S. PATENT DOCUMENTS

| | | | |
|---|---|---|---|
| 2005/0052813 A1 | 3/2005 | Kobayashi | |
| 2009/0205411 A1 | 8/2009 | Müller | |
| 2013/0106477 A1* | 5/2013 | Urban | ................ H03L 7/091 |
| | | | 327/156 |

FOREIGN PATENT DOCUMENTS

| | | |
|---|---|---|
| CN | 101517381 A | 8/2009 |
| CN | 103026628 A | 4/2013 |
| DE | 102005015547 A1 | 10/2006 |
| DE | 102005020862 A1 | 11/2006 |
| DE | 102006034105 A1 | 1/2008 |
| DE | 102010030982 A1 | 1/2012 |
| WO | 9749980 A1 | 12/1997 |

* cited by examiner

COMPENSATION OF A PHASE SHIFT OF AT LEAST ONE COMPONENT OF AN ELECTRONIC SYSTEM OF A VIBRONIC SENSOR

CROSS-REFERENCE TO RELATED APPLICATIONS

The present application is related to and claims the priority benefit of German Patent Application No. 10 2016 117 194.8, filed on Sep. 13, 2016 and International Patent Application No. PCT/EP2017/072749, filed on Sep. 11, 2017 the entire contents of which are incorporated herein by reference.

TECHNICAL FIELD

The present invention relates to a compensation device for compensating for at least one phase shift caused by at least one component of an electronic system unit of a vibronic sensor, a vibronic sensor for determining and/or monitoring at least one process variable of a medium having a corresponding compensation device, and a method for operating the corresponding vibronic sensor.

BACKGROUND

Vibronic sensors are often used in process and/or automation technology. In the case of fill-level measuring devices, they have at least one mechanically oscillatable unit, such as a tuning fork, a single rod, or a membrane. During operation, the latter is excited to mechanical oscillations by a driving/receiving unit, often in the form of an electromechanical transducer unit that can, in turn, be a piezoelectric drive or an electromagnetic drive, for example. In the case of flow meters, the mechanically oscillatable unit can, however, also be designed as an oscillatable pipe, through which the respective medium flows, such as in a measuring device operating according to the Coriolis principle.

A wide variety of corresponding field devices are produced by the applicant and, in the case of fill-level measuring devices, are distributed under the names, LIQUIPHANT or SOLIPHANT, for example. The underlying measurement principles are known in principle from numerous publications. The driving/receiving unit excites the mechanically oscillatable unit to mechanical oscillations by means of an electrical excitation signal. Conversely, the driving/receiving unit can receive the mechanical oscillations of the mechanically oscillatable unit and convert them into an electrical receive signal. The driving/receiving unit is accordingly either a separate driving unit and a separate receiving unit, or a combination driving/receiving unit. In many cases, the driving/receiving unit is part of a feedback electrical oscillating circuit, by means of which the excitation of the mechanically oscillatable unit to mechanical oscillations takes place. For example, for a resonant oscillation, the oscillating circuit condition, according to which the sum of all amplifications in the oscillating circuit, or the amplification factor, is 1, and all phases occurring in the oscillating circuit result in a multiple of 360°, must be satisfied.

In order to excite the vibronic sensor and, concomitantly, to satisfy the oscillating circuit condition, a certain phase shift must be ensured between the excitation signal and the receive signal. A predeterminable value for the phase shift, i.e., a target value for the phase shift between the excitation signal and the receive signal, is therefore often adjusted. For this purpose, the most varied solutions, with both analog and digital methods, have become known from the prior art. For example, a predeterminable phase shift is frequently adjusted using a suitable filter, or the respectively existing phase shift is regulated by means of a control loop to a predeterminable phase shift—the target value. In this respect, DE102006034105A1 disclosed the use of an adjustable phase shifter. The additional integration of an amplifier with adjustable amplification factor for additional control of the oscillation amplitude, on the other hand, was described in DE102007013557A1. According to DE102005015547A1, an all-pass filter is, however, used. Also possible is the adjustment of a phase shift between the excitation signal and the receive signal, based upon the respectively existing frequency of the receive signal, by means of a so-called frequency scan, such as disclosed in DE102009026685A1, DE102009028022A1, and DE102010030982A1, or by means of a phase-locked loop (PLL), as described in DE102010030982A1.

In principle, in the case of a vibronic sensor, both the excitation signal and the receive signal are characterized by their frequency f, amplitude A, and/or phase $\phi$. Accordingly, changes in these variables are usually used to determine the respective process variable, such as a predetermined fill-level, a flow rate, the density, and/or the viscosity. In the case of a vibronic limit level switch for liquids, for example, a distinction is made as to whether the oscillatable unit is covered by the liquid or oscillates freely. These two states, the free state and the covered state, are differentiated, for example, on the basis of different resonant frequencies, i.e., a frequency shift, in the presence of a predeterminable phase shift between the excitation signal and the receive signal. On the other hand, the density and/or viscosity can be determined using such a measuring device only if the oscillatable unit is covered by the medium. Vibronic sensors suitable for determining the density and/or viscosity and corresponding measurement principles are known, for example, from documents DE10057974A1, DE102006033819A1, DE10050299A1, and DE102007043811A1.

Regardless of whether the fill-level, the density, or the viscosity is to be determined, a predeterminable phase shift between the excitation signal and the receive signal must be adjusted, wherein the measurement accuracy of a corresponding measuring device basically depends upon the adjustment accuracy of the phase shift. This is particularly true to a particularly high degree in the case of determining the viscosity and/or density, the reliable determination of which requires a phase adjustment accuracy of about 1°.

However, due to the frequency-based excitation and signal evaluation, problems may occur during ongoing operation of a vibronic sensor in the determination and/or monitoring of the respective process variable, due to various interfering influences, such as, for example, external vibrations, such as vibrations of pumps or ultrasonic baths. These interfering influences, which are, in particular, problematical with regard to the adjustment accuracy of the predeterminable phase shift, then have a disadvantageous effect on the measurement accuracy of the respective vibronic sensor. In order to avoid a reduced measurement accuracy or measurement performance due to corresponding interfering influences, DE102012101667A1 proposes to configure a control/evaluation unit, in the presence of at least one external vibration as a function of the frequency and/or amplitude of the external vibration, to control the oscillation excitation in such a way that the receive signal is essentially not disturbed by the external vibration, and/or to suppress at least one frequency of an external vibration.

A vibronic sensor which is also particularly insensitive with respect to such—in particular, mechanical—interfering influences has become known from DE102014119061A1. The electronic system unit of this sensor comprises at least one adaptive filter and is designed to appropriately adjust the filter characteristic, which describes the properties of the filter, in such a way that a predeterminable target phase shift occurs between the excitation signal and the receive signal. Reference is made to this document in its entirety below.

Another important aspect with respect to the adjustment accuracy of a predeterminable phase shift are the—in particular, electronic—components respectively used for the production of the vibronic sensor. Namely, the phase shift respectively existing at a specific point in time between the excitation signal and the receive signal results from the summation of the phases respectively caused by the components used—in particular, the components of the electronic system unit. Since these components are themselves dependent upon, among other things, various process parameters, such as the temperature or the pressure, they are not necessarily constant over time. In order to counteract this problem, the previously unpublished German patent application with reference number 102015112421.1 introduced a vibronic sensor having a phase correction unit, which determines a phase correction value from at least one characteristic variable of at least one component of the sensor depending upon at least one process parameter, and adjusts the predeterminable phase shift between the excitation signal and the receive signal according to the phase correction value. Reference is also made to this document in its entirety below.

It is true that, in addition to the above-mentioned interfering influences and the influences caused by the process parameters, the phase shifts caused by the individual components are themselves, in principle, subject to certain tolerances, which can result in a disadvantageous effect on the measurement accuracy of the vibronic sensor. In order to take this aspect into account, complex calibrations are, where applicable, carried out for each individual sensor.

SUMMARY

Proceeding from this problem, the present invention is based upon the aim of specifying a vibronic sensor with as high a measurement accuracy as possible.

With regard to the compensation device, the present invention achieves the underlying aim with a compensation device for compensating for at least one phase shift caused by at least one component of an electronic system unit of a vibronic sensor, wherein the vibronic sensor has at least one electromechanical converter unit. This compensation device comprises at least:
- a bridging unit for electrically bridging at least the electromechanical converter unit,
- a signal generation unit for generating at least one first test excitation signal in the form of an electrical alternating signal having a first selectable frequency,
- a phase detection unit for determining at least one existing first phase shift between the test excitation signal and at least one first test receive signal which passes through at least the bridging unit and the at least one component of the electronic system unit, and
- a computer unit which determines a phase compensation instruction at least from the first phase shift.

The compensation unit is configured to transfer the phase compensation instruction to a phase adjustment unit of the electronic system unit of the vibronic sensor.

The compensation device thus serves to at least correct or compensate for the phase shift of at least one component of the vibronic sensor. The phase shift caused by the at least one component is determined by means of the compensation device, and a phase compensation instruction is calculated therefrom, which is transferred to the electronic system unit. The electronic system unit, in turn, then takes into account the phase compensation instruction when adjusting the predeterminable phase shift.

It is conceivable for the compensation device to be designed such that it successively determines the phase shifts caused by individual components or groups of components in each case, and then determines the phase compensation instruction from the individual values or the sum of the individual phase shifts of the respective components or component groups. Alternatively, however, it can also be designed in such a way that, during an operation, it determines the phase shifts of all respectively relevant components in the sum and determines from this value the phase compensation instruction.

In each case, the electromechanical converter unit is electrically bridged to determine a phase compensation instruction. In addition, one or more—in particular, electronic—components of the sensor, which cause additional phase shifts, can be bridged. The signal generation unit is in turn designed to at least generate a test excitation signal of a predeterminable first frequency. However, it can also be designed to generate several test excitation signals of different frequencies. In the latter case, frequency dependencies of the phase shifts caused by the individual components of the sensor can, advantageously, also be compensated for.

The phase compensation instruction is preferably not determined during the continuous measurement operation, but in a separate interval, referred to as compensation operating mode below. According to the invention, the compensation device can be designed such that it is used before the respective vibronic sensor is put into operation. It can then be attached to the sensor once, for example. Advantageously, it is able to determine the phase shifts caused by the electronic components of the sensor in a substantially automated and independent manner, and to create a corresponding phase compensation instruction. Complex, separate calibrations and compensation operations for taking into account, for example, fault tolerances of the components used are thus dispensed with. As an alternative, the compensation unit can also be designed to be part of the sensor. In the latter case, it is also possible to repeatedly execute the compensation operating mode at predeterminable time intervals and to thus also take into account temporal changes of the phase shifts caused by the various components.

In one embodiment, the compensation device can be detachably connected to the electronic system unit of the vibronic sensor. It may, for example, be designed as a needle adapter or the like. However, further possible embodiments generally known to the person skilled in the art are also conceivable and also come under the present invention.

An advantageous embodiment of the present invention provides that the bridging unit comprise a bridging branch connected at least in parallel to the electromechanical converter unit. If further components are electrically bridged, in addition to the electromechanical converter unit, the bridging branch is preferably also connected in parallel to these components.

In this case, it is advantageous if the bridging branch comprises at least one capacitor, one coil, or one resistor. These electrical components serve as a replacement switching element for the electromechanical converter unit. If the latter comprises, for example, at least one piezoelectric element, the bridging branch preferably comprises at least one capacitor. On the other hand, a coil is preferred in the case of an electromagnetic drive. At least one characteristic variable of the respective component used, for this embodiment, in the bridging branch is in this case preferably adapted to at least one corresponding characteristic variable of the electromechanical converter unit.

According to another preferred embodiment, the signal generation unit is a unit for generating a signal of variable frequency—in particular, a controlled oscillator. Both an analogously controlled as well as a digitally controlled oscillator come into consideration in this case. In this way, the frequency dependency of the phase shifts caused by the individual components of the sensor can be determined by means of the compensation unit, and a frequency-dependent phase compensation instruction can be calculated.

It is advantageous if the compensation device comprises at least one—in particular, adaptive—filter—in particular, a bandpass filter or a resonator filter. This embodiment is particularly suitable in the case of a vibronic sensor according to document DE102014119061A1, as already described in the introduction to the description.

It is also advantageous if the compensation device comprises at least one phase correction unit, as described in the previously unpublished German patent application with reference number 102015112421.1 already mentioned in the introduction to the description. In this case, the influence on the phase adjustment accuracy may additionally be taken into account by various process parameters.

Lastly, in another embodiment of the compensation device, the at least one component is an analog input stage or an analog output stage, e.g., an operational amplifier—in particular, a charging amplifier—an impedance converter, or a filter—in particular, an anti-aliasing filter. It can also be an analog-to-digital converter, a digital-to-analog converter, a transistor stage, or an analog switch of the vibronic sensor. The respectively relevant components of the sensor, which can cause additional phase shifts between the excitation signal and the receive signal, vary according to the design—in particular, of the electronic system unit—and according to the operating principle selected for generating and detecting the mechanical oscillations of the vibronic sensor. In particular, the present invention can be used both in analog and in digital electronic system units for a vibronic sensor.

The aim according to the invention is further achieved by a vibronic sensor for determining at least one process variable of a medium in a container, at least comprising an electromechanical converter unit and an electronic system unit, wherein the electronic system unit has a compensation device according to at least one of the preceding claims. The electronic system unit is further designed to
 generate the excitation signal from the receive signal,
 adjust a predeterminable phase shift between the excitation signal and the receive signal by means of a phase adjustment unit provided in the electronic system unit, and
 determine the at least one process variable from the receive signal and/or monitor it.

In this case as well, the compensation unit associated with the vibronic sensor can either be detachably connectible to the same or can be designed as a fixed component of the vibronic sensor. The vibronic sensor according to the invention thus comprises means for calibrating or for compensating for at least one of its electronic components with respect to the phase shift between the excitation signal and the receive signal.

All variants of vibronic sensors sufficiently known to the person skilled in the art, as listed in the introduction to the description, come into consideration as a phase adjustment unit in this case. For example, the phase adjustment unit can comprise at least one filter—in particular, an adaptive filter—as described in publication DE102014119061A1.

In one embodiment, the electromechanical converter unit comprises at least one piezoelectric element or one coil.

In a further advantageous embodiment, the vibronic sensor further comprises at least one switching element for switching back and forth between a measurement operating mode, in which the at least one process variable is determined and/or monitored, and a compensation operating mode, in which the phase correction instruction is determined and transferred to the phase adjustment unit. The compensation operating mode can thus be activated repeatedly at predeterminable points in time or after predeterminable time intervals, and the phase correction instruction which is used by the phase adjustment unit of the vibronic sensor can be updated.

According to a further embodiment, the process variable is a predeterminable fill-level of the medium in the container, the density, and/or the viscosity of the medium.

One embodiment provides that an oscillatable unit—in particular, a membrane, a single rod, or a tuning fork—is provided.

The aim according to the invention is, lastly, also achieved by a method for operating a vibronic sensor according to the invention for determining and/or monitoring at least one process variable, wherein a phase compensation instruction for compensating for at least one phase shift caused by at least one component of an electronic system unit of the vibronic sensor is determined in a compensation operating mode, wherein a predeterminable phase shift between the excitation signal and the receive signal is adjusted in a measurement operating mode, wherein the phase compensation instruction is taken into account for adjusting the predeterminable phase shift, and wherein the at least one process variable is determined and/or monitored.

With respect to the method, it is advantageous if the compensation operating mode is executed once when the sensor is put into operation, or if the compensation operating mode is executed periodically at selectable time intervals.

An embodiment of the method further provides that a phase shift of at least one component of the electronic system unit caused by a change in the ambient temperature be compensated for by means of the compensation operating mode.

According to a further embodiment of the method according to the invention, a single test excitation signal with a first predeterminable frequency is used in the compensation operating mode, and the existing first phase shift between the test excitation signal and the test receive signal is used as phase correction instruction.

In an alternative embodiment of the method, on the other hand, at least one first and one second test excitation signal having at least one first and one second frequency are used in the compensation operating mode, wherein at least one first and one second phase shift are calculated between the first or the second test excitation signal and the test receive signal, wherein a polynomial function of a predeterminable, at least first, order is calculated as phase correction instruction at least from the values of the first and second frequencies and at least from the first and second phase shifts. The number of test excitation signals with different frequency $f_n$ in each case preferably corresponds to at least the order n' of the polynomial function.

It is pointed out that the embodiments in connection with the compensation device, the vibronic sensor, and the method can be applied mutatis mutandis to one another in each case.

BRIEF DESCRIPTION OF THE DRAWINGS

The invention and its advantageous embodiments are explained in more detail below with reference to FIG. 1-FIG. 3. These show.

DETAILED DESCRIPTION

Figure 1:
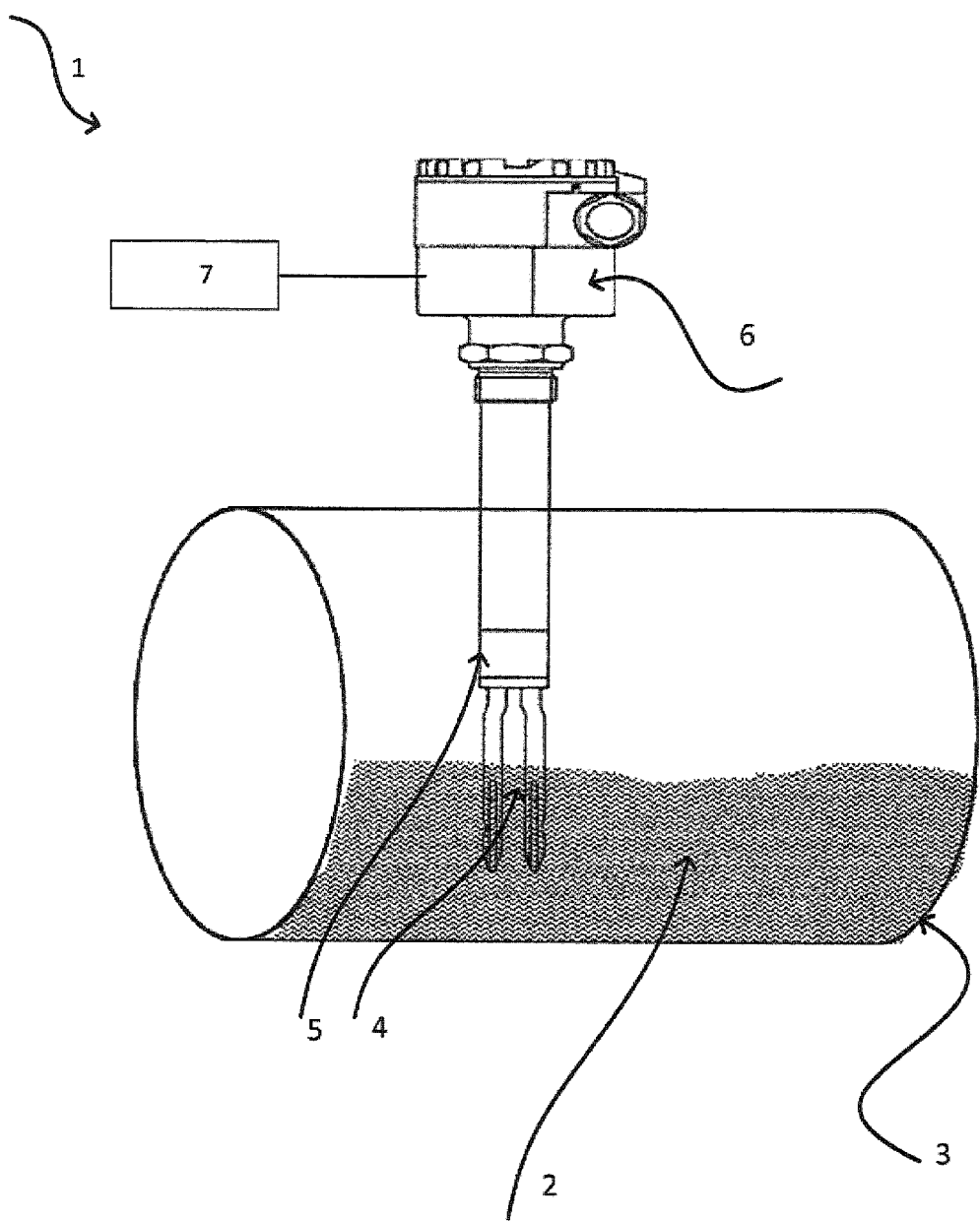
FIG. 1 shows a schematic drawing of a vibronic sensor with a compensation unit according to the invention.

FIG. 1 shows a vibronic sensor 1. An oscillatable unit 4 is depicted in the form of a tuning fork which is partially immersed into a medium 2, which is located in a container 3. The oscillatable unit is excited by the excitation/receiving unit 5 to mechanical oscillations and can, for example, be a piezoelectric stack drive or bimorph drive. However, it is, naturally, understood that other embodiments of a vibronic sensor also come under the invention. In addition, an electronic system unit 6 is illustrated, by means of which the signal acquisition, evaluation, and/or supply take place. The electronic system unit is also electrically-conductively and detachably connected to a compensation unit 7 according to the invention, by means of which at least one phase compensation instruction for compensating for at least one additional phase shift caused by a component of the vibronic sensor 1 (especially, a component of the electronic system unit 6) between the excitation signal and the receive signal can be compensated for.

Figure 2:
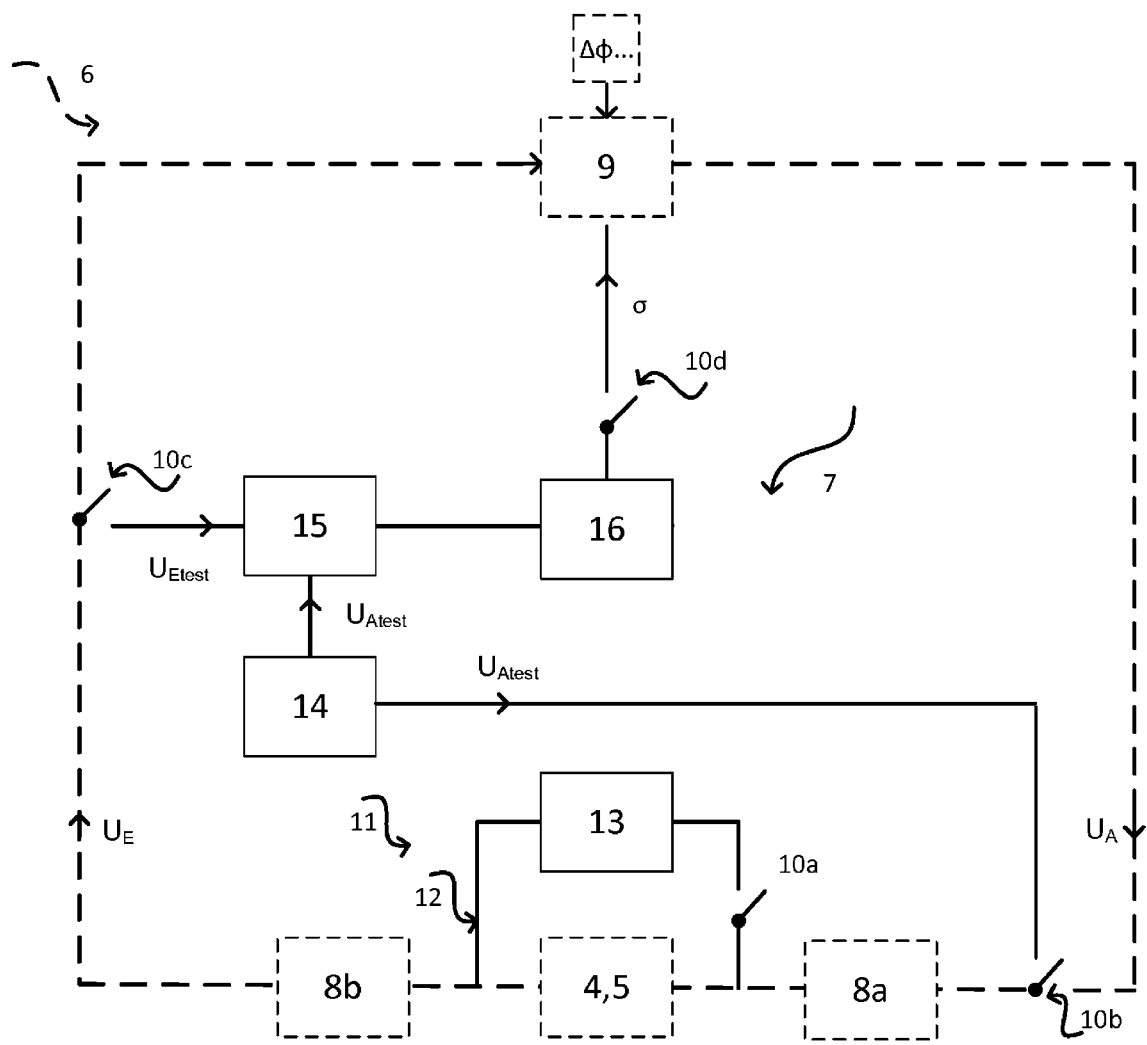
FIG. 2 shows a block diagram of an analog electronic system unit of a vibronic sensor with a compensation device according to the invention.

FIG. 2 shows a block diagram of a vibronic sensor 1 with an analog electronic system unit 6 of a vibronic sensor 1 with an associated suitable compensation unit 7. Those components which are to be assigned to the electronic system unit 6 of the vibronic sensor 1 are shown in dashed lines in each case. In a measurement operating mode, the oscillatable unit 4 is excited to mechanical oscillations by means of the electromechanical converter unit 5 and by means of an excitation signal $U_A$, which first passes through an analog output stage 8a. The receive signal $U_E$ received from the oscillatable unit 4 or the electromechanical converter unit 5 first passes through an analog input stage 8b, before being provided to a phase adjustment unit 9, e.g., a phase shifter, which is representative here for all those components of the electronic system unit 6, which, among other things, serve to adjust the predeterminable phase shift $\Delta\varphi$ between the excitation signal $U_A$ and the receive signal $U_E$, to evaluate the receive signal $U_E$ with respect to the respective process variable, and to generate the excitation signal $U_A$ from the receive signal $U_E$. Various additional, analog operating modes for a vibronic sensor 1 are known to the person skilled in the art from the prior art, and are described, for example, in the documents cited in the introduction to the description, which is why this aspect is not discussed in detail below.

In the embodiment of the present invention shown in FIG. 2, the compensation operating mode is started by means of the four switching elements 10a-10d. The compensation unit 7 is part of the electronic system unit 6 of the vibronic sensor 1. Other embodiments may also provide a separate compensation unit 7, which can—in particular, detachably—be connected to the electronic system unit 6—for example, in the form a needle adapter.

The bridging unit 11 of the compensation unit 7 comprises a bridging branch 12 connected in parallel to the electromechanical converter unit 5 and having a capacitor 13. In this way, the phase shifts caused by the analog output stage 8a and by the analog input stage 8b are together detected in the form of a first existing phase shift $\Delta\varphi_{test1}$ and compensated for in the compensation operating mode. In another embodiment, however, the bridging unit 11 can also bridge at least one further component of the electronic system unit 6—for example, the analog input stage 8b or the analog output stage 8a. Then, this additionally bridged component is not taken into account in the compensation operating mode. In order to exclude individual components from the compensation operating mode, the switching element 10b can, alternatively, also be arranged at a different position. In the case that the analog output stage 8a is not to be taken into account, the switching element 10b must, for example, be arranged in the block diagram of FIG. 2 between the vibronic sensor 4, 5 and the analog output stage 8a. In the latter case, the phase shifts $\Delta\varphi_{test1}$, $\Delta\varphi_{test2}$ ... caused by individual components of the electronic system unit 6 can be individually determined by, for example, specific variation of the circuits and, where applicable, be subsequently compensated for together.

During the compensation operating mode, at least one first test excitation signal $U_{Atest1}$ of a first predeterminable frequency $f_1$ is generated by means of the signal generation unit 14—here, a controlled oscillator. The frequency $f_1$ is in this case preferably identical to the frequency f of the excitation signal $U_A$. The test excitation signal $U_{Atest1}$ passes through the analog output stage 8a, the bridging unit 11, and the analog input stage 8b, and is subsequently supplied to the phase detection unit 15. Conceivable for the phase detection unit 15 are different, analog as well as digital, embodiments which are sufficiently known to the person skilled in the art and which all come under the present invention. The phase detection unit 15 is also supplied by the signal generation unit 14 with the test excitation signal $U_{Atest1}$ so that it can determine the first phase shift $\Delta\varphi_{test1}$ existing between the test excitation signal the $U_{Atest1}$ and the test receive signal $U_{Etest1}$. A computer unit 16 subsequently determines a phase compensation instruction a at least from the first phase shift $\Delta\varphi_{test1}$. In the case where a frequency dependency of the phase shifts caused by the components of the vibronic sensor is to be taken into consideration, the signal generation unit 14, the phase detection unit 15, and the computer unit 16 are further designed to generate at least two test excitation signals $U_{Atest1}$, $U_{Atest2}$ with two different frequencies $f_1$ and $f_2$, to receive the two test receive signals $U_{Etest1}$, $U_{Etest2}$, to determine the two phase shifts $\Delta\varphi_{test1}$ and $\Delta\varphi_{test2}$, and to calculate therefrom a phase compensation instruction $\sigma$.

Figure 3:
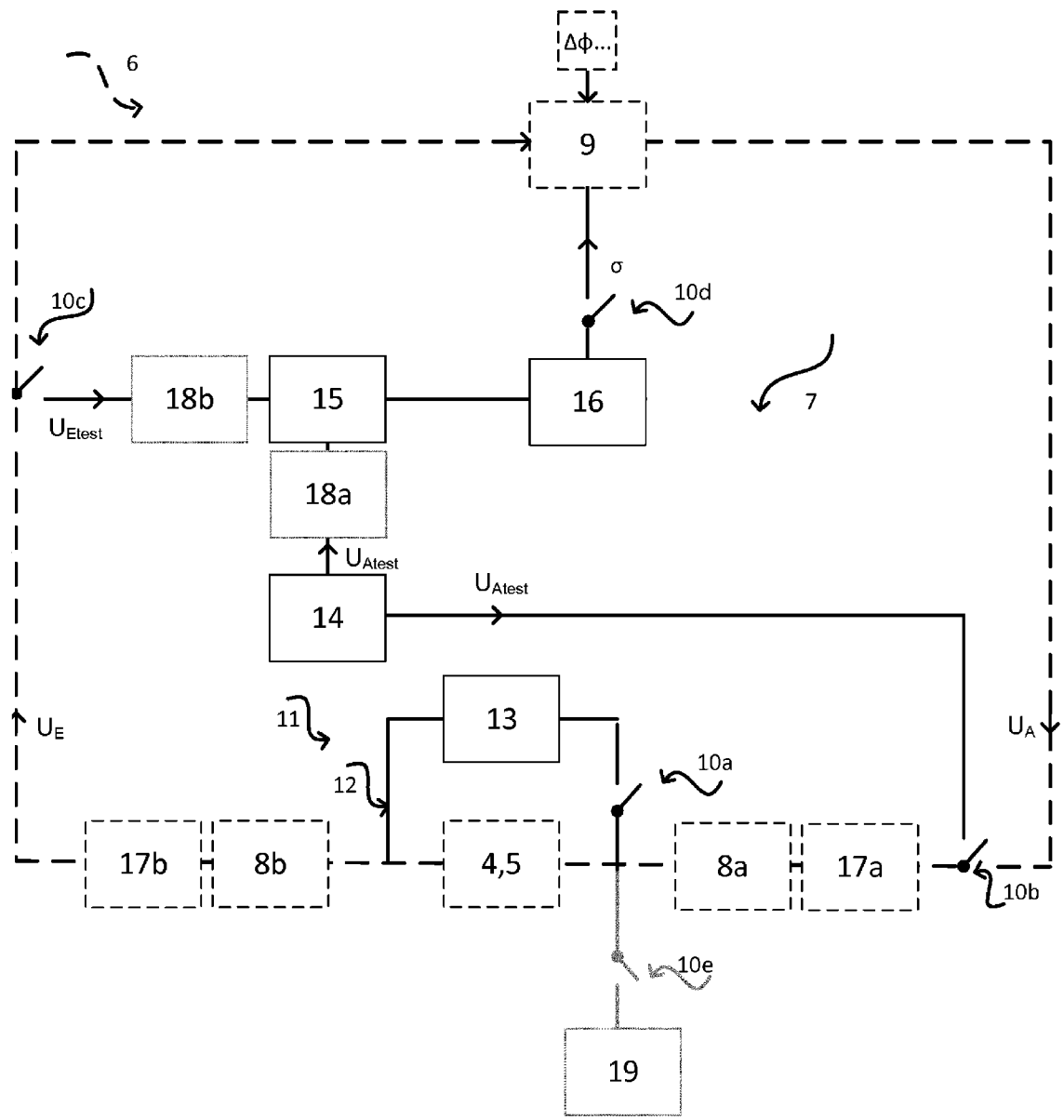
FIG. 3 shows a block diagram of a digital electronic system unit of a vibronic sensor with a compensation device according to the invention.

A compensation unit 7 suitable, in particular, for a digital electronic system unit 6 of a vibronic sensor 1 is, lastly, shown in FIG. 3, also in the form of a block diagram. Components which have already been explained in conjunction with FIG. 2 are not discussed again below. In contrast to the analog electronic system unit 6 according to FIG. 2, the digital electronic system unit 6 according to FIG. 3 additionally comprises an analog-to-digital converter 17b and a digital-to-analog converter 17, both components being taking into account with regard to their phase shifts in the context of the compensation operating mode.

At least one filter—in particular, an adaptive filter 18a—can, optionally, furthermore be assigned to the compensation device 7; in the embodiment shown here, two filters 18a, 18b are provided. This embodiment is, in particular, suitable for a vibronic sensor as described in DE102012101667A1. In this case, the filters 18a, 18b are adapted, in particular, to the adaptive filter (not shown separately here) of the electronic system unit 6 of the vibronic sensor 1 and are, in particular, structurally identical thereto.

A further optional addition consists in the integration of a reference element 19 which can be operated via a fifth switching element 10e. Depending upon the embodiment of the electromechanical converter unit 5, the reference element 19 may, for example, be provided by a capacitor or a coil. This reference element 19 serves to determine an additional phase shift caused by at least one process parameter, as described in the previously unpublished German patent application with reference number 102015112421.1.

The invention claimed is:

1. A compensation device for compensating for a phase shift caused by a component of an electronic system unit of a vibronic sensor, wherein the vibronic sensor includes an electromechanical converter, the compensation device comprising:
   a bridging unit for electrically bridging and thereby bypassing the electromechanical converter, wherein the bridging unit includes a bridging branch connected in parallel to the electromechanical converter;
   a signal generation unit for generating a test excitation signal in the form of an electrical alternating signal having a first selectable frequency;
   a phase detection unit for determining a first phase shift between the test excitation signal and a test receive signal that passes through the bridging unit and the component of the electronic system unit; and
   a computer unit configured to determine a phase compensation instruction from the first phase shift,
   wherein the compensation device is configured to transfer the phase compensation instruction to a phase adjustment unit of the electronic system unit of the vibronic sensor.

2. The compensation device according to claim 1, wherein the compensation device is detachably connectible to the electronic system unit of the vibronic sensor.

3. The compensation device according to claim 1, wherein the bridging branch includes a switch and further includes a capacitor, a coil, or a resistor.

4. The compensation device according to claim 1, wherein the signal generation unit is a controlled oscillator configured to generate a signal of variable frequency.

5. The compensation device according to claim 1, further comprising:
   an adaptive filter, including a bandpass filter or a resonator filter.

6. The compensation device according to claim 1, further comprising:
   a phase correction unit.

7. The compensation device according to claim 1, wherein the component of the electronic system unit is an analog input stage including an operational amplifier, an analog output stage including an operational amplifier, an impedance converter, a filter, an analog-to-digital converter, a digital-to-analog converter, a transistor stage, or an analog switch of the vibronic sensor.

8. A vibronic sensor for determining a process variable of a medium in a container, comprising:
   an electromechanical converter; and
   an electronic system unit including a phase adjustment unit and a compensation device, the compensation device including:
      a bridging unit for electrically bridging and thereby bypassing the electromechanical converter, wherein the bridging unit includes a bridging branch connected in parallel to the electromechanical converter;
      a signal generation unit for generating a test excitation signal in the form of an electrical alternating signal having a first selectable frequency;
      a phase detection unit for determining a first phase shift between the test excitation signal and a test receive signal that passes through the bridging unit and the component of the electronic system unit; and
      a computer unit configured to determine a phase compensation instruction from the first phase shift,
      wherein the compensation device is configured to transfer the phase compensation instruction to the phase adjustment unit,
   wherein the electronic system unit is configured to generate an excitation signal from a receive signal, to adjust a predeterminable phase shift between the excitation signal and the receive signal using the phase adjustment unit, and to determine the process variable from the receive signal.

9. The vibronic sensor according to claim 8, wherein the electromechanical converter includes a piezoelectric element or a coil.

10. The vibronic sensor according to claim 8, further comprising:
    a switching element for switching back and forth between a measurement operating mode in which the process variable is determined and a compensation operating mode in which the phase correction instruction is determined and transferred to the phase adjustment unit.

11. The vibronic sensor according to claim 8, wherein the process variable is a predeterminable fill-level of the medium in the container, a density of the medium, or a viscosity of the medium.

12. The vibronic sensor according to claim 8, wherein the electromechanical converter includes an oscillatable unit including a membrane, a single rod, or a tuning fork.

13. A method for operating a vibronic sensor for determining and/or monitoring a process variable, comprising:
    determining in a compensation operating mode a phase compensation instruction for compensating for a phase shift caused by a component of an electronic system unit of the vibronic sensor, wherein a first test excitation signal having a first frequency and a second test excitation signal having a second frequency are used in the compensation operating mode;
    calculating a first phase shift between the first test excitation signal and a first test receive signal and a second phase shift between the second test excitation signal and a second test receive signal;
    calculating from the values of the first frequency, the second frequency, the first phase shift, and the second phase shift a polynomial function of predeterminable order as the phase compensation instruction;

adjusting in a measurement operating mode a predeterminable phase shift between an excitation signal and a receive signal;

adjusting the predeterminable phase shift using the phase compensation instruction; and determining the process variable.

14. The method according to claim 13, wherein the compensation operating mode is executed once when the vibronic sensor is put into operation, or wherein the compensation operating mode is executed periodically at selectable time intervals.

15. The method according to claim 13, wherein a phase shift of a component of the electronic system unit caused by a change in an ambient temperature is compensated for in the compensation operating mode.

* * * * *